(12) United States Patent
Mitchell et al.

(10) Patent No.: US 7,327,264 B1
(45) Date of Patent: Feb. 5, 2008

(54) SYSTEM AND METHOD FOR EXTENDING PERFORMANCE OF MEDIA CARTRIDGE RF IDENTIFICATION

(75) Inventors: Larry Stephen Mitchell, Longmont, CO (US); William Carl Dodt, Broomfield, CO (US); Zengqi Yu, Fort Collins, CO (US)

(73) Assignee: Storage Technology Corporation, Louisville, CO (US)

( * ) Notice: Subject to any disclaimer, the term of this patent is extended or adjusted under 35 U.S.C. 154(b) by 335 days.

(21) Appl. No.: 10/942,710

(22) Filed: Sep. 16, 2004

(51) Int. Cl.
 *G08B 13/14* (2006.01)
(52) U.S. Cl. .................. 340/572.7; 340/572.1
(58) Field of Classification Search ............ 340/572.1, 340/572.4, 572.7, 572.8, 10.1, 10.2, 10.3, 340/505; 235/383, 384, 385
See application file for complete search history.

(56) References Cited

U.S. PATENT DOCUMENTS

| | | | |
|---|---|---|---|
| 3,713,148 A | 1/1973 | Cardullo et al. | |
| 3,981,011 A | 9/1976 | Bell, III | |
| 4,364,043 A | 12/1982 | Cole et al. | |
| 4,517,563 A | 5/1985 | Diamant | |
| 4,730,188 A | 3/1988 | Milheiser | |
| 4,742,470 A | 5/1988 | Juengel | |
| 4,807,140 A | 2/1989 | Saulnier | |
| 4,827,395 A | 5/1989 | Anders et al. | |
| 4,888,423 A | 12/1989 | Odorisio et al. | |
| 4,952,928 A | 8/1990 | Carroll et al. | |
| 5,008,661 A | 4/1991 | Raj | |
| 5,124,699 A | 6/1992 | Tervoert et al. | |
| 5,159,332 A | 10/1992 | Walton | |
| 5,194,856 A | 3/1993 | Zijlstra | |
| 5,212,806 A | 5/1993 | Natarajan | |
| 5,231,273 A | 7/1993 | Caswell et al. | |
| 5,302,954 A | 4/1994 | Brooks et al. | |
| 5,638,239 A | 6/1997 | Ohgi | |
| 5,983,363 A | 11/1999 | Tuttle et al. | |
| 6,081,857 A | 6/2000 | Frary | |
| 6,226,688 B1 | 5/2001 | Frary | |
| 6,304,416 B1 | 10/2001 | McAllister et al. | |
| 6,330,971 B1 * | 12/2001 | Mabry et al. ............... | 235/383 |
| 6,466,990 B2 | 10/2002 | Frary | |
| 6,669,089 B2 * | 12/2003 | Cybulski et al. ............ | 235/385 |
| 7,042,358 B2 * | 5/2006 | Moore ...................... | 340/572.1 |
| 7,091,827 B2 * | 8/2006 | Stilp ......................... | 340/10.1 |

OTHER PUBLICATIONS

Schroeder, Ernst F., et al., Improvement Of The User Interface For Video Cassette Recorders By 'Memory-In-Cassette', IEEE Transactions on Consumer Electronics, vol. 39, No. 3, Aug. 1993.
Certificate of Accuracy for Patent No. 64-70987 from Japanese language to English language, English translation and Japanese language application.
Certificate of Accuracy for Patent No. 64-70987 from Japanese language to English language, English translation and Japanese language application, Jul. 18, 2003.

* cited by examiner

*Primary Examiner*—Van T. Trieu
(74) *Attorney, Agent, or Firm*—Brooks Kushman P.C.

(57) ABSTRACT

A method of extending media cartridge radio frequency identification (RFID) performance physical range includes mounting a plurality of passive antenna couplers in a first sending/receiving device, connecting the couplers to a radio transmitter/receiver in the first sending/receiving device, and communicating wirelessly between the first sending/receiving device and a second radio transmitter/receiver in a second sending/receiving device within a predetermined physical range.

20 Claims, 3 Drawing Sheets

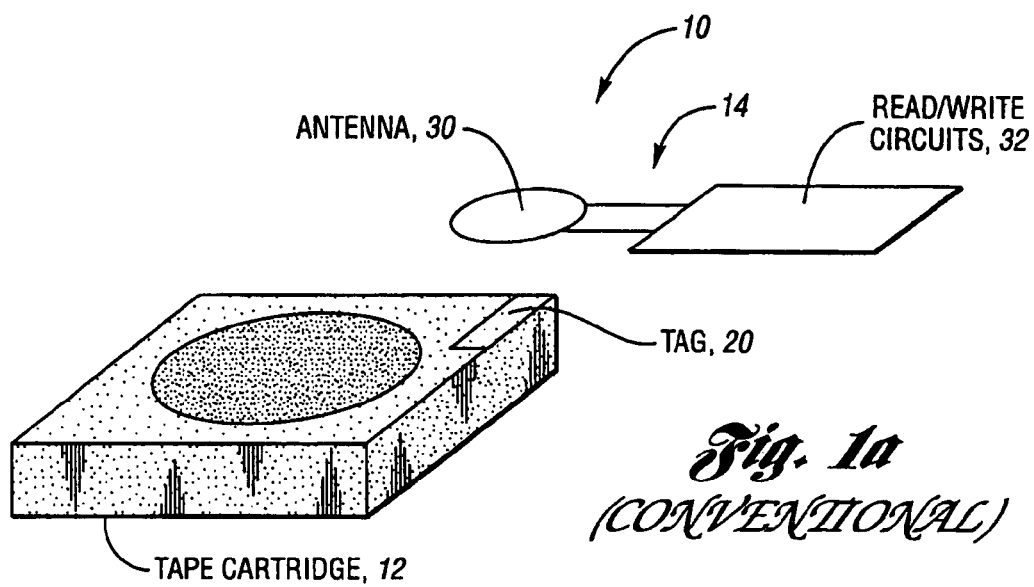
Fig. 1a (CONVENTIONAL)
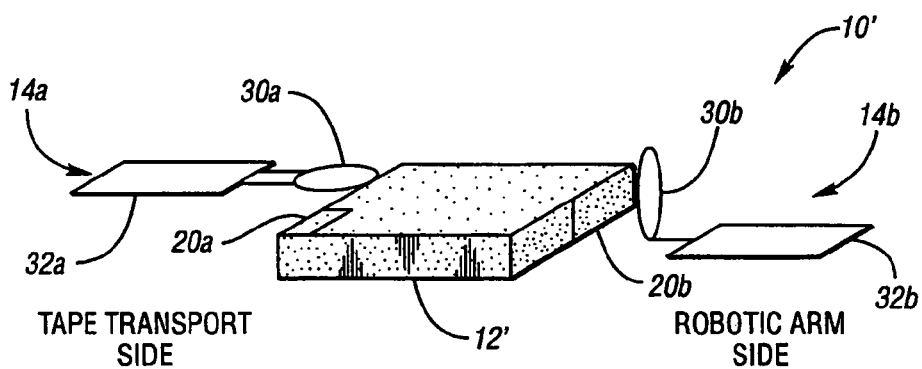
Fig. 1b (CONVENTIONAL)

SYSTEM AND METHOD FOR EXTENDING PERFORMANCE OF MEDIA CARTRIDGE RF IDENTIFICATION

BACKGROUND OF THE INVENTION

1. Field of the Invention

The present invention relates to a system and a method for extending performance of media cartridge radio frequency identification.

2. Background Art

Radio frequency identification (RFID) and data storage protocols are designed into new generation tape drives and media cartridges. An RFID "tag" (or transponder and non-volatile memory) is implemented into each media cartridge. The RFID tag provides for assignment of unique identification information to individual cartridges and the information stored in the respective media. The RFID tags are electromagnetically read from and written to by a read/write device. The read/write device can be implemented in connection with at least one of a tape (or media) transport and a media library robotic retrieval arm assembly.

Referring to FIG. 1a, a diagram of a conventional media cartridge and RFID read/write system 10 is shown. The system 10 includes a media (e.g., tape) cartridge 12 having an RFID tag 20 that is read from and written to by a read/write device 14 that is implemented in connection with a robot arm (not shown). The read/write device 14 includes an antenna 30 connected to read/write circuitry 32.

The conventional system 10 generally operates at a nominal frequency of 13.56 MHZ with the RFID tag (e.g., transponder and non-volatile memory) 20 and the antenna 30 in relatively close proximity (i.e., typically less than 2.74 cm of separation). However, a tape transport read/write device (not shown) accesses the cartridge 12 from a different direction than does the robot arm. As such, an antenna for the tape transport read/write device can not typically access the RFID 20 within a nominal design distance (i.e., less than 2.74 cm of separation), and reliable operation of the system 10 can be difficult to achieve.

Referring to FIG. 1b, a diagram of another conventional media cartridge and read/write device system 10' is shown. The system 10' attempts to overcome some of the deficiencies of the system 10. A media (e.g., tape) cartridge 12' includes two separated RFID tags. An RFID tag 20a is read from and written to by a read/write device 14a that is implemented in connection with a tape transport (not shown), and an RFID tag 20b is read from and written to by a read/write device 14b that is implemented in connection with a robot arm (not shown). The read/write devices 14 include respective antennas 30 connected to read/write circuitry 32.

The conventional system 10' generally provides for the antennas 30 to maintain the relatively close proximity (i.e., typically less than 2.74 cm of separation) to respective RFID tags 20 during normal operation, however, the system 10' generally still has reliability deficiencies because differing information can be stored on the separate RFID tags 20a and 20b. Further, the cost of additional RFID tags for a media cartridge can be a significant expense, and the cost premium of the cartridge 12' can be a significant inhibitor to sales and user implementation.

Thus there exists an opportunity and need for an improved system and method for cost effectively extending the physical range of performance of media cartridge radio frequency identification.

SUMMARY OF THE INVENTION

The present invention generally provides a system and a method for new, improved and innovative techniques for extending the physical range of performance of media cartridge radio frequency identification (RFID) by modification of the antenna on at least one of the cartridge and a read/write device that is implemented in connection with the cartridge. The present invention generally provides a system and a method for a multi-point response RFID configuration.

According to the present invention, a method of extending media cartridge radio frequency identification (RFID) performance physical range is provided. The method comprises mounting a plurality of passive antenna couplers in a first sending/receiving device, connecting the couplers to a radio transmitter/receiver in the first sending/receiving device, and communicating wirelessly between the first sending/receiving device and a second radio transmitter/receiver in a second sending/receiving device within a predetermined physical range.

Also according to the present invention, a system for extending media cartridge radio frequency identification (RFID) performance physical range is provided. The system comprises a plurality of passive antenna couplers mounted in a first sending/receiving device, a radio transmitter/receiver connected to the couplers in the first sending/receiving device, and a second radio transmitter/receiver in a second sending/receiving device for communicating wirelessly with the first sending/receiving device within a predetermined physical range.

Further, according to the present invention, for use in an information storage system, a method of extending media cartridge radio frequency identification (RFID) performance physical range is provided. The method comprises mounting a plurality of passive antenna couplers in a first sending/receiving device, connecting the couplers to a radio transmitter/receiver in the first sending/receiving device, mounting a second plurality of passive antenna couplers in a second sending/receiving device, connecting the second couplers to a second radio transmitter/receiver in the second sending/receiving device, and communicating wirelessly between the first and second radio transmitter/receivers within a predetermined physical range.

The above features, and other features and advantages of the present invention are readily apparent from the following detailed descriptions thereof when taken in connection with the accompanying drawings.

BRIEF DESCRIPTION OF THE DRAWINGS

FIGS. 1(a-b) are diagrams of conventional media cartridge radio frequency identification (RFID) read/write systems;

DETAILED DESCRIPTION OF THE PREFERRED EMBODIMENT(S)

With reference to the Figures, the preferred embodiments of the present invention will now be described in detail. Generally, the present invention provides an improved system and method for new and innovative techniques for extending the physical range of performance of media cartridge radio frequency identification by modification of an antenna on at least one of the cartridge and a read/write device that is implemented in connection with the cartridge. The improved system and method of the present invention generally provides an improved antenna system for extending performance of media cartridge radio frequency identification (RFID).

The present invention generally provides a multi-point response coupling antenna (e.g., passive coupling antenna) configuration for media cartridge RFID system. An antenna coupler of the present invention may be implemented as at least one of an inductive coupler and a capacitive coupler. The present invention generally provides for extending media cartridge RFID performance physical range by mounting a plurality of passive antenna couplers to at least one sending/receiving device.

In one example (described in connection with FIG. 2), the sending/receiving device may be implemented as a media cartridge RFID tag. In another example (described in connection with FIG. 4a), the sending/receiving device may be implemented as a media cartridge transport system. In yet another example (described in connection with FIG. 4b), the sending/receiving device may be implemented as a media cartridge robotic arm. However, the plurality of passive antenna couplers may be mounted to any appropriate sending/receiving device or devices in combination to meet the design criteria of a particular application (i.e., to maintain a predetermined physical range of operation).

Figure 2:
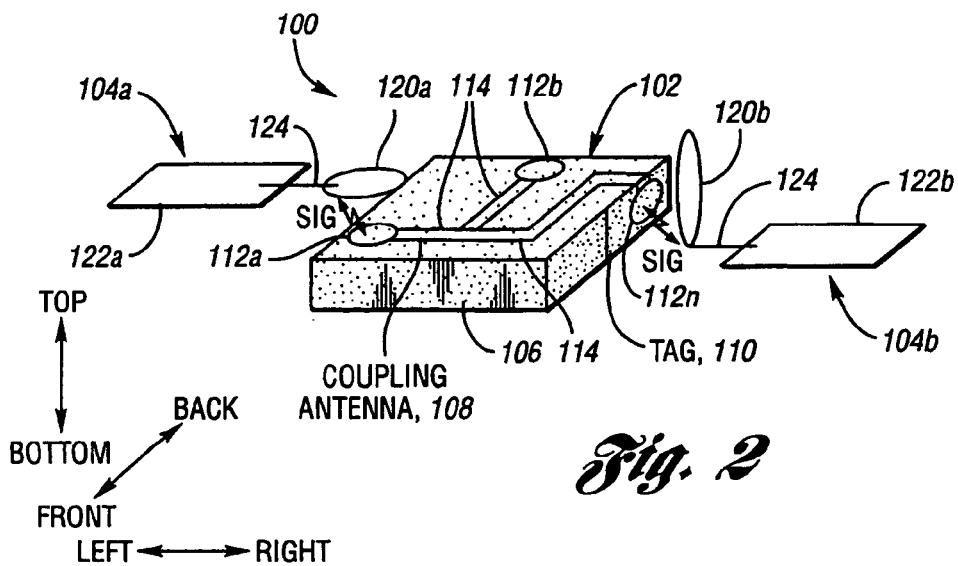
FIG. 2 is a diagram of a multi-point response RFID read/write system of the present invention.

Referring to FIG. 2, a diagram of one example of a media cartridge and RFID read/write system 100 of the present invention is shown. The system 100 is generally implemented in connection with an information storage system (e.g., a tape library system and the like). The system 100 generally comprises a media (e.g., tape, disk, etc.) cartridge 102 having a housing 106 with an RFID tag (i.e., label, unit, assembly, device, etc.) 110 that may be mounted (i.e., installed, affixed, positioned, etc.) thereto, thereon, inside of, at an inner or an outer surface, or in connection with any appropriate location to meet the design requirements of a particular application and media (not shown). The RFID tag 110 is generally wirelessly read from and written to by at least one of a read/write device 104a that is implemented in connection with a media (e.g., tape) transport (not shown), and by a read/write device 104b that is implemented in connection with a robot arm (e.g., a media library robotic retrieval arm assembly, not shown).

The RFID tag 110 is generally implemented as a transponder (i.e., a radio transmitter/receiver that transmits identifiable signals automatically when proper interrogation is received) and a non-volatile memory for storing information carried in the signals that are transmitted from and received by the RFID tag 110. The RFID tag 110 generally provides for assignment of unique identification information to individual cartridges 102 and the information stored in the respective media. The RFID tags 110 are electromagnetically (i.e., wirelessly, without direct contact, etc.) read from and written to by the read/write devices 104.

In one example, the RFID tags 110 may be used to store (i.e., hold, contain, keep, record, etc.) meta-data, that is, data about data. Meta-data is generally definitional data that provides information about or documentation of other data managed within an application or environment. For example, meta-data would document data about data elements or attributes, (name, size, data type, etc) and data about records or data structures (length, fields, columns, etc) and data about data (where it is located, how it is associated, ownership, etc.). Meta-data may include descriptive information about the context, quality and condition, or characteristics of the data. Meta-data may further include data about the media on which the data is stored (e.g., media defects, media errors, media usage history, and the like).

The cartridge 102 comprises a coupling antenna system 108 (described in more detail in connection with FIGS. 3(a-b)) that includes a plurality of antenna couplers 112 (e.g., couplers 112a-112n) that are connected to the RFID tag 110 via connecting interfaces 114. The coupling antenna system 108 generally couples signals carrying data, information, meta-data, commands, etc. and energy (e.g., SIG) that are transmitted (i.e., broadcast, presented, sent, electromagnetically communicated, etc.) between the read/write devices 104 and the RFID tag 110. The system 100 generally provides a coupling antenna attachment or system (e.g., the passive coupling antenna 108) that may extend performance of the RFID tag 110 by generating a multi-point response configuration (e.g., via the couplers 112).

The read/write device 104 includes at least one antenna coupler 120 connected to read/write circuitry 122 via a connecting interface 124 (multiple antenna couplers 120 are described in more detail in connection with FIGS. 4(a-b) below). The read/write circuitry 122 generally comprises a transponder. The signals and energy (e.g., the signals SIG) that are transmitted between the RFID tag 110 and the read/write circuitry 122 are generally coupled via the antenna couplers 112 and the antenna couplers 120. The antenna couplers 120 may be implemented similarly to the antenna couplers 112.

The antenna couplers 112 are generally located on or within the cartridge 102 to provide a physical proximity to antenna couplers 120 that meets the read/write physical range design criteria of the system 100 during normal operation of the tape transport and the robotic arm (e.g., to maintain a predetermined physical range of operation such as less than 2.74 cm of separation between a coupler 112 and a respective coupler 120 when a nominal operating frequency is 13.56 MHZ). In one example, one or more of the couplers 112 may be located at corners of the housing 106.

In another example, one or more of the couplers 112 may be located at top and bottom surfaces of the housing 106. In yet another example, one or more of the couplers 112 may be located at side (or edge) surfaces (e.g., at least one of left, right, front, and back surfaces) of the housing 106. However, the antenna couplers 112 are generally positioned (i.e., located, disposed, fixed, mounted, placed, etc.) at any appropriate location to minimize interference from or signal blockage by metal while maintaining a predetermined physical range of operation.

In one example, the antenna couplers 112 and 120 may be implemented as closed loop (or closed end) couplers (described in more detail in connection with FIGS. 3a and 3b). In another example, the antenna couplers 112 and 120 may be implemented as open-ended couplers (described in more detail in connection with FIG. 3c).

The connecting interfaces 114 may be implemented as at least one of a flex circuit, traces printed on inner and/or outer surfaces of the housing 106, foil affixed on inner and/or outer surfaces of the housing 106, plating formed on inner and/or outer surfaces of the housing 106, a conductive plane, conductive material embedded in the housing 106, and the like. The connecting interfaces 114 are generally implemented as any appropriate conductor to meet the design criteria of a particular application.

In one example, the system 100 generally operates at a nominal frequency of 13.56 MHZ with at least one of the antenna couplers 112 in relatively close proximity to (i.e., to maintain a predetermined physical range of operation, typically less than 2.74 cm of separation from) at least one of the antenna couplers 120 during normal operation of the tape transport and the robotic arm. However, the system 100 may be operated at any appropriate frequency to meet the design criteria of a particular application (e.g., a frequency, $f_R$, that is substantially the same for the antenna system 108 and the RFID tag 110). Thus, the system 100 generally provides an improved antenna system (e.g., the antenna system 108) for extending performance of media cartridge radio frequency identification (RFID) by providing multi-point response antenna coupling.

Figure 3A:
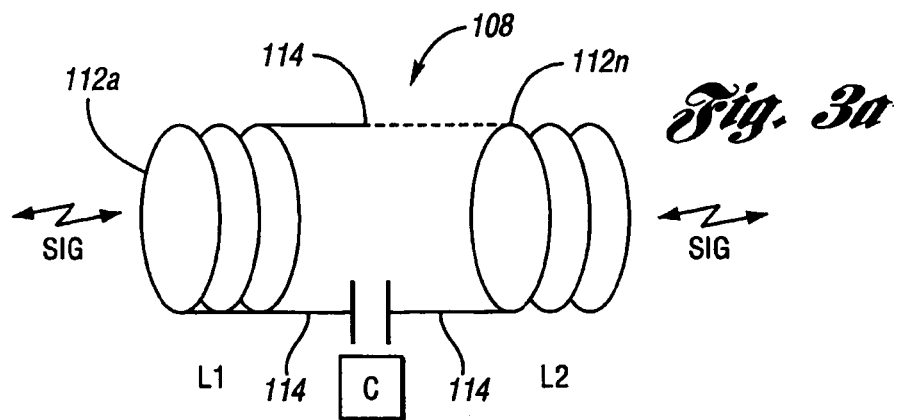
FIGS. 3(a-d) are diagrams of antenna couplers implemented in connection with the present invention.

Referring to FIG. 3a, a diagram of an example of a closed end coupling antenna system 108 that may be implemented in connection with the system 100 is shown. In one example, the antenna system 108 may be implemented as a closed end (or closed loop) inductive coupler. The antenna system 108 generally comprises two or more inductive elements 112 (e.g., elements having inductances, L1 and L2) electrically coupled (i.e., connected) together and to a capacitive element 130 (e.g., an element having a capacitance, C) to form a loop circuit.

The capacitive element 130 is generally implemented in connection with the system 100 read/write circuitry (e.g., the circuitry of the transponders within the RFID label 110 and the circuitry 122). The inductive element 112a may have a first terminal that may be connected (e.g., via the interconnection 114) to a first terminal of the inductive element 112n, and a second terminal that may be connected (e.g., via the interconnection 114) to a first terminal of the capacitive element 130. The inductive element 112n may have a second terminal that may be connected (e.g., via the interconnection 114) to a second terminal of the capacitive element 130.

The antenna system 108 may be implemented as an L-C circuit. In one example, the antenna system 108 may be implemented as a single L-C system. In another example (e.g., as illustrated in FIG. 2), the antenna system 108 may be implemented as a combination of two or more mutually coupled L-C systems. The system 108 is generally tuned to a resonant frequency (e.g., $f_R$), where $f_R=1/(2\pi*(L*C)^{1/2})$. For example, when the system 108 as illustrated in FIG. 3a is implemented, $L=L1+L2$, and $f_R=1/(2\pi*((L1+L2)*C)^{1/2})$.

The value of the inductive elements 112 and the capacitive element 130 that is used in the equation $f_R=1/(2\pi*(L*C)^{1/2})$ is generally an effective value L and C for the respective location of the inductive elements 112 and the capacitive element 130. The system 108 may be tuned by selection of or adjustment of the values L and C to meet the design criteria of a particular application.

In other examples (not shown), the inductive elements 112 may be implemented in at least one parallel or series-parallel configuration.

Figure 3B:
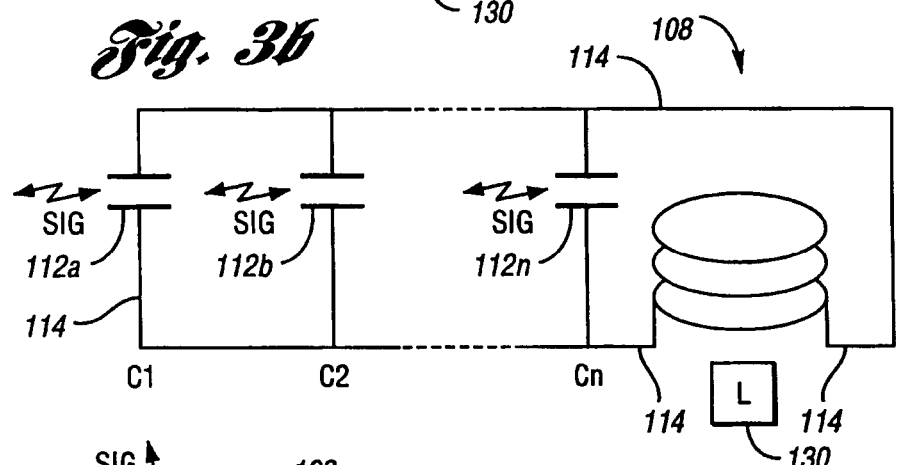

Referring to FIG. 3b, a diagram of an alternative coupling antenna system 108 that may be implemented in connection with the system 100 is shown. In another example, the antenna system 108 may be implemented as a closed loop (or closed end) capacitive coupler. The antenna system 108 generally comprises two or more capacitive elements 112 (e.g., elements 112a, 112b, . . . 112n having respective capacitances, C1, C2, . . . ,Cn) electrically coupled (i.e., connected) together in parallel to each other and serially electrically coupled (i.e., connected) to an inductive element 130 (e.g., an element having an inductance, L) to form a loop circuit.

The inductive element 130 is generally implemented in connection with the system 100 read/write circuitry (e.g., the circuitry of the transponders within the RFID label 110 and the circuitry 122). The capacitive elements 112 may have first terminals that may be connected (e.g., via the interconnection 114) to a first terminal of the inductive element 130. The capacitive elements 112 may have a second terminal that may be connected (e.g., via the interconnection 114) to a second terminal of the inductive element 130. When the system 108 as illustrated in FIG. 3b is implemented, $(1/C_{effective})=(1/C1)+(1/C2)+(1/C3)+(1/C4)+ \ldots +(1/Cn)$, and $f_R=1/(2\pi*(L*C_{effective})^{1/2})$.

Figure 3C:
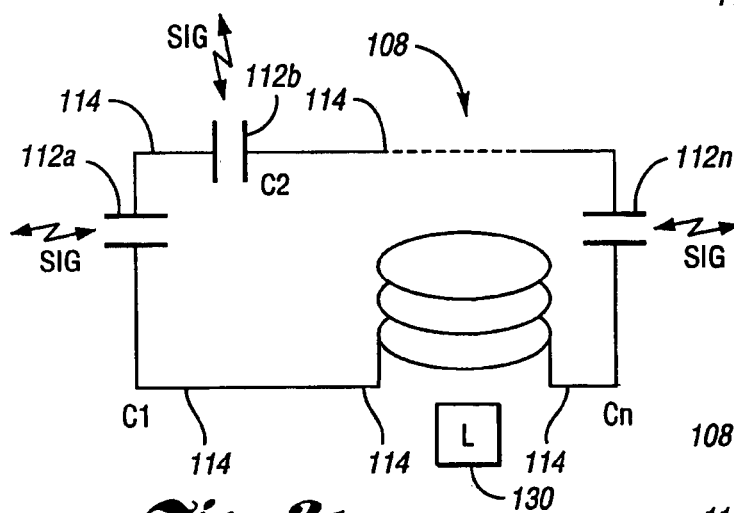

Referring to FIG. 3c, a diagram of another alternative coupling antenna system 108 that may be implemented in connection with the system 100 is shown. In yet another example, the antenna system 108 may be implemented as a closed loop (or closed end) capacitive coupler. The antenna system 108 generally comprises two or more capacitive elements 112 (e.g., elements 112a, 112b, . . . 112n having respective capacitances, C1, C2, . . . ,Cn) serially electrically coupled (i.e., connected) together to each other and to an inductive element 130 (e.g., an element having an inductance, L) to form a loop circuit.

The inductive element 130 is generally implemented in connection with the system 100 read/write circuitry (e.g., the circuitry of the transponders within the RFID label 110 and the circuitry 122). The capacitive element 112a may have a first terminal that may be connected (e.g., via the interconnection 114) to a first terminal of the capacitive element 112b, and a second terminal that may be connected (e.g., via the interconnection 114) to a first terminal of the inductive element 130. The capacitive element 112b may have a second terminal that may be connected (e.g., via the interconnection 114) to a first terminal of a capacitive element 112n. The capacitive element 112n may have a second terminal that may be connected (e.g., via the interconnection 114) to a second terminal of the inductive element 130. When the system 108 as illustrated in FIG. 3c is implemented, $C_{effective}=(C1+C2+ \ldots +Cn)$, and $f_R=1/(2\pi*(L*C_{effective})^{1/2})$.

In another example (not shown), the capacitive elements 112 may be implemented in at least one series-parallel configuration.

Figure 3D:
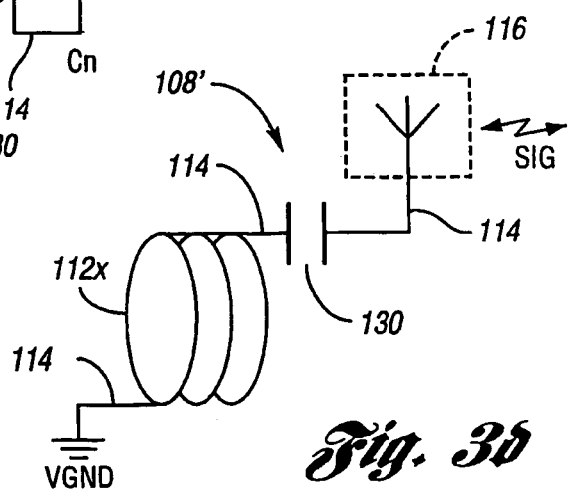

Referring to FIG. 3d, a diagram of a coupling antenna system 108' that may be implemented in connection with the system 100 is shown. The antenna system 108' may be implemented as an open-ended coupler. The antenna system 108' generally comprises one of the inductive elements 112 (e.g., element 112x), the capacitive element 130, and a shaped element 116 that are serially connected to form an open-ended coupler. The shaped element 116 is generally implemented as a receiving/radiating element. In one example, the element 116 may be implemented as "branches" or "tendrils" of wires, traces, metallic strips, and the like. In another example (not shown), the element 116 may be implemented as a single wire, trace, metallic strips, and the like. However, the element 116 may be implemented having any appropriate configuration (i.e., shape) to meet the design criteria of a particular application.

The inductive element 112 may have a first terminal may be connected (e.g., via the interconnection 114) to a ground potential (e.g., VGND), and a second terminal that may be connected (e.g., via the interconnection 114) to a first terminal of the capacitive element 130. The capacitive element 130 may have a second terminal that may be connected (e.g., via the interconnection 114) to the receiving/radiating element 116. The antenna system 108' may be implemented as a serial L-C resonance circuit that is tuned to the resonant frequency, $f_R$. In one example, the inductor 112x may be implemented in connection with the RFID tag 110. In another example, the inductor 112x may be implemented as a stand-alone component. Similarly, in one example, the capacitive element 130 may be implemented in connection with the RFID tag 110. In another example, the capacitive element 130 may be implemented as a stand-alone component.

Figure 4A:
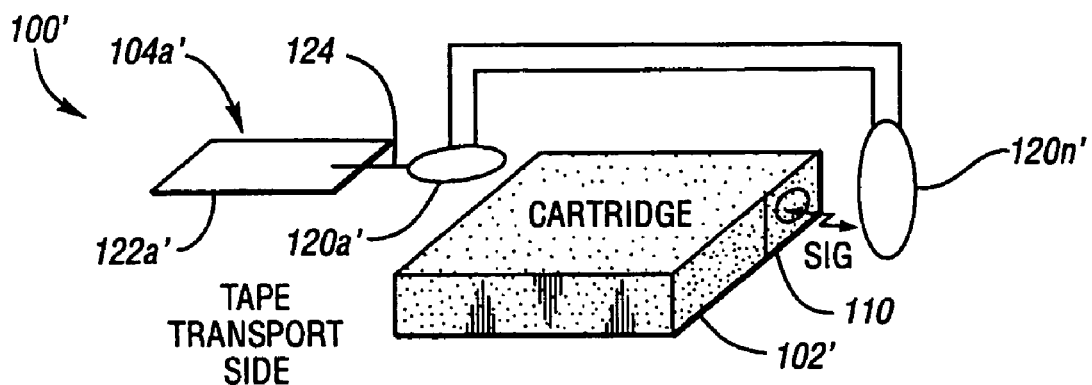
FIGS. 4(a-b) are diagrams of alternative multi-point response RFID read/write systems of the present invention.

Referring to FIG. 4a, a diagram of another example multi-point coupler system 100' of the present invention, where the coupler is implemented in connection with the tape transport system 104 (e.g., a system 104a'), is shown. The system 100' may be implemented similarly to the system 100. The system 104a' generally comprises a plurality of (i.e., at least two) antenna couplers 120' (e.g., couplers 120a' and 120n') connected to read/write device 122a' via the connecting interfaces 124. The connecting interfaces 124 are generally implemented as wiring, flex circuits, and the like.

The antenna couplers 120' are generally provided at locations on the tape transport mechanism such that at least one of an RFID 110 and at least one antenna coupler 112 that are implemented in connection with a media cartridge 102 may be accessed for read/write operations within media system physical range design criteria to maintain a predetermined physical range of operation. The system 100' generally provides a single tape transport system 104 (e.g., the system 104a') that may perform read/write operations on media cartridges having a variety of RFID and antenna coupler locations without the user implementing common cartridge RFID and antenna coupler location formats (i.e., without modification to the media cartridges).

The system 104a' may be advantageously used in connection with a conventional media cartridge (i.e., a media cartridge that is implemented having one or more RFID tags, and without antenna couplers 112). The system 104a' may also be advantageously used in connection with media cartridge 102 (i.e., media cartridges having multi-point antenna couplers 112). As such, the system 100' generally provides extended physical range media cartridge performance using multi-point response.

Figure 4B:
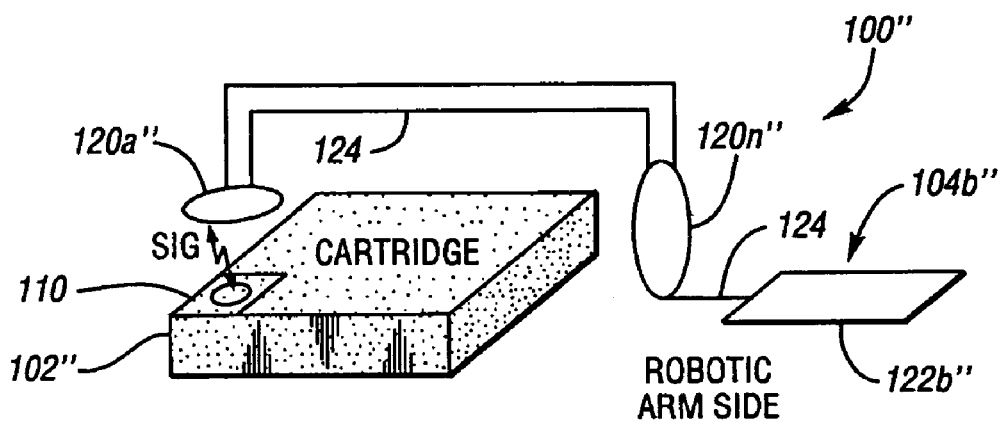

Referring to FIG. 4b, a diagram of yet another multi-point coupler system 100" of the present invention, where the coupler is implemented in connection with the robotic arm system 104 (e.g., a system 104b"), is shown. The system 100" may be implemented similarly to the system 100 and the system 100'. The system 104b" generally comprises a plurality of (i.e., at least two) antenna couplers 120" (e.g., couplers 120a" and 120n") connected to read/write device 122b" via the connecting interfaces 124.

The antenna couplers 120" are generally provided at locations on the robotic arm mechanism such that at least one of an RFID 110 and at least one antenna coupler 112 that are implemented in connection with a media cartridge 102" may be accessed for read/write operations within media system physical range design criteria to maintain a predetermined physical range of operation. The system 100" generally provides a single robotic arm system 104 (e.g., the system 104b") that may perform read/write operations on media cartridges having a variety of RFID and antenna coupler locations without the user implementing common cartridge RFID and antenna coupler location formats (i.e., without modification to the media cartridges).

The system 104b" may be advantageously used in connection with a conventional media cartridge (i.e., a media cartridge that is implemented having one or more RFID tags, and without antenna couplers 112). The system 104b" may also be advantageously used in connection with the media cartridge 102 (i.e., media cartridges having multi-point antenna couplers 112). As such, the system 100" generally provides extended media cartridge physical range performance using multi-point response while maintaining a predetermined physical range of operation.

The systems 100, 100' and 100" generally provide for reading from and writing to media cartridges 102 having at least one of an RFID 110 and an antenna coupler 112 at varying locations (i.e., multi-point response). Thus, the physical range of the systems 100, 100' and 100" is generally improved over conventional approaches at a lower system cost. While illustrated separately for clarity, the tape transport read/write system 104a' and the robotic arm read/write system 104b" may be implemented independently or in connection with each other in a single system 100 (not shown).

As is readily apparent from the foregoing description, then, the present invention generally provides an improved method and an improved system for extending the physical range of performance of media cartridge radio frequency identification (RFID). The present invention generally provides for reading from and writing to a media cartridge having a single RFID tag using read/write devices that are implemented in connection with a tape transport and a media library robotic arm via multi-point response to maintain a predetermined physical range of operation.

The present invention generally implements two or more antenna couplers (e.g., two or more couplers 112 and couplers 120) in connection with a single RFID tag (e.g., the RFID tag 110). As such, overall system reliability may be improved at a lower cost than conventional approaches. That is, the present invention generally provides a cost effective solution for extending media cartridge RFID performance to multi-sensed locations (i.e., the physical range is improved). The present invention may also provide for the implementation of unique data encoding and identification parameters (e.g., enhanced meta-data).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of extending media cartridge radio frequency identification (RFID) performance physical range, the method comprising:

mounting a plurality of passive antenna couplers in a media cartridge RFID tag, wherein the passive antenna couplers comprise two or more inductive elements electrically connected together and to a capacitive element to form a loop circuit;

connecting the couplers to a radio transmitter/receiver in the media cartridge RFID tag; and communicating wirelessly between the media cartridge RFID tag and a second radio transmitter/receiver in a second sending/receiving device within a predetermined physical range.

2. The method of claim 1 wherein the second sending/receiving device is at least one of a media cartridge RFID tag, a media cartridge transport system, and a media cartridge robotic arm.

3. The method of claim 1 further comprising mounting a plurality of second passive antenna couplers in the second sending/receiving device, and connecting the second couplers to the second radio transmitter/receiver in the second sending/receiving device.

4. The method of claim 3 wherein at least one of the plurality of second passive antenna couplers comprises two or more inductive elements electrically connected together and to a capacitive element to form a loop circuit.

5. The method of claim 4 wherein the values of the inductive elements and the capacitive element are effective values for the respective locations of the inductive elements and the capacitive elements.

6. The method of claim 1 wherein at least one of the plurality of passive antenna couplers comprises an open-ended coupler having an inductive element, a capacitive element, and a shaped element that are serially connected.

7. The method of claim 6 wherein the shaped element comprises a receiving/radiating element shaped as branches or tendrils of at least one of wires, traces, and metallic strips.

8. The method of claim 6 wherein the shaped element comprises a receiving/radiating element shaped as at least one of a single wire, trace, and metallic strip.

9. The method of claim 1 wherein communicating comprises transmitting and receiving at least one of data, commands, and meta-data.

10. A system for extending media cartridge radio frequency identification (RFID) performance physical range, the system comprising:
a plurality of passive antenna couplers mounted in a media cartridge RFID tag, wherein the plurality of passive antenna couplers comprises two or more inductive elements electrically connected together and to a capacitive element to form a loop circuit;
a radio transmitter/receiver connected to the couplers in the media cartridge RFID tag; and
a second radio transmitter/receiver in a second sending/receiving device for communicating wirelessly with the media cartridge RFID tag within a predetermined physical range.

11. The system of claim 10 wherein the first and second sending/receiving device is at least one of a media cartridge RFID tag, a media cartridge transport system, and a media cartridge robotic arm.

12. The system of claim 10 further comprising a plurality of second passive antenna couplers mounted in the second sending/receiving device and connected to the second radio transmitter/receiver in the second sending/receiving device.

13. The system of claim 12 wherein at least one of the plurality of passive antenna couplers comprises two or more inductive elements electrically connected together and to a capacitive element to form a loop circuit.

14. The system of claim 13 wherein the values of the inductive elements and the capacitive element are effective values for the respective locations of the inductive elements and the capacitive elements.

15. The system of claim 10 wherein at least one of the plurality of passive antenna couplers comprises an open-ended coupler having an inductive element, a capacitive element, and a shaped element that are serially connected.

16. The system of claim 15 wherein the shaped element comprises a receiving/radiating element shaped as branches or tendrils of at least one of wires, traces, and metallic strips.

17. The system of claim 16 wherein the shaped element comprises a receiving/radiating element shaped as at least one of a single wire, trace, and metallic strip.

18. The system of claim 10 wherein communicating comprises transmitting and receiving at least one of data, commands, and meta-data.

19. For use in an information storage system, a method of extending media cartridge radio frequency identification (RFID) performance physical range, the method comprising:
mounting a plurality of passive antenna couplers in a media cartridge RFID tag, wherein the plurality of passive antenna couplers comprises two or more inductive elements electrically connected together and to a capacitive element to form a loop circuit;
connecting the couplers to a radio transmitter/receiver in the media cartridge RFID tag;
mounting a second plurality of passive antenna couplers in a second sending/receiving device;
connecting the second couplers to a second radio transmitter/receiver in the second sending/receiving device; and
communicating wirelessly between the media cartridge RFID tag and the second radio transmitter/receiver within a predetermined physical range.

20. The method of claim 19 wherein the first and second sending/receiving device is at least one of a media cartridge RFID tag, a media cartridge transport system, and a media cartridge robotic arm.

* * * * *

UNITED STATES PATENT AND TRADEMARK OFFICE
CERTIFICATE OF CORRECTION

PATENT NO. : 7,327,264 B2  Page 1 of 1
APPLICATION NO. : 10/942710
DATED : February 5, 2008
INVENTOR(S) : Larry Stephen Mitchell et al.

It is certified that error appears in the above-identified patent and that said Letters Patent is hereby corrected as shown below:

Column 9, Line 39, Claim 11:

After "wherein" delete "first and"

Signed and Sealed this

Tenth Day of June, 2008

JON W. DUDAS
*Director of the United States Patent and Trademark Office*